(12) United States Patent
Branly et al.

(10) Patent No.: US 9,209,590 B2
(45) Date of Patent: Dec. 8, 2015

(54) DEVICE FOR AMPLIFYING A LASER BEAM WITH SUPPRESSION OF TRANSVERSE LASING

(75) Inventors: Stéphane Branly, Brieres-les-Scelles (FR); Christophe Derycke, Paris (FR); Sébastien Laux, Palaiseau (FR)

(73) Assignee: Thales, Courbevoie (FR)

( * ) Notice: Subject to any disclaimer, the term of this patent is extended or adjusted under 35 U.S.C. 154(b) by 50 days.

(21) Appl. No.: 13/811,242

(22) PCT Filed: Jul. 19, 2011

(86) PCT No.: PCT/EP2011/062385
§ 371 (c)(1),
(2), (4) Date: May 2, 2013

(87) PCT Pub. No.: WO2012/010610
PCT Pub. Date: Jan. 26, 2012

(65) Prior Publication Data
US 2013/0215915 A1 Aug. 22, 2013

(30) Foreign Application Priority Data
Jul. 20, 2010 (FR) .................................. 10 03042

(51) Int. Cl.
*H01S 3/10* (2006.01)
*H01S 3/04* (2006.01)
(Continued)

(52) U.S. Cl.
CPC ................ *H01S 3/10* (2013.01); *H01S 3/0615* (2013.01); *H01S 3/0407* (2013.01); *H01S 3/061* (2013.01);
(Continued)

(58) Field of Classification Search
CPC ....... H01S 3/10; H01S 3/0407; H01S 3/0616; H01S 3/0604; H01S 3/0606; H01S 3/061; H01S 3/0612; H01S 3/0671; H01S 3/08018; H01S 3/09415
USPC .................. 359/333, 346; 372/34, 35, 66, 67
See application file for complete search history.

(56) References Cited

U.S. PATENT DOCUMENTS

| 6,115,400 A | 9/2000 | Brown |
| 6,813,289 B2 * | 11/2004 | Gruzdev et al. ................. 372/34 |

(Continued)

FOREIGN PATENT DOCUMENTS

| FR | 2877776 A1 | 5/2006 |
| FR | 2901067 A1 | 11/2007 |

(Continued)

OTHER PUBLICATIONS

F.G. Patterson, et al., "Suppression of Parasitic Lasing in Large-Aperturn Ti:sapphire Laser Amplifiers", Optics Letters, Jul. 15, 1999, pp. 963-965, vol. 24, No. 14, Opt. Soc. America USA, XP002629588.

(Continued)

*Primary Examiner* — Eric Bolda
(74) *Attorney, Agent, or Firm* — Baker & Hostetler LLP

(57) ABSTRACT

A device for amplifying a laser beam along an axis comprises: an amplifying bar structure of index $n_c$, delimited by a surface connecting the input and output faces of the structure, having a dimension e along the axis and $\Phi$ along a perpendicular direction, with $e<\Phi$, and intended to be pumped to become a gain medium with a maximum along a face, and a liquid of index $n_A$ which surrounds the structure in relation to its surface and which is absorbent or scattering at the fluorescence wavelength of the amplifying bar structure. The surface comprises a first tooth in the form of a chamfer at its junction with the maximum gain face, to avoid causing parasitic transverse lasing and the liquid of index $n_A$ has a heat capacity of greater than 3000 Joules per kilogram per K° to dissipate the thermal power induced by the pumping.

14 Claims, 3 Drawing Sheets

(51) Int. Cl.
   *H01S 3/06*      (2006.01)
   *H01S 3/08*      (2006.01)
   *H01S 3/0941*    (2006.01)

(52) U.S. Cl.
   CPC ............ *H01S 3/0604* (2013.01); *H01S 3/0606* (2013.01); *H01S 3/0612* (2013.01); *H01S 3/0617* (2013.01); *H01S 3/08018* (2013.01); *H01S 3/09415* (2013.01); *H01S 2301/02* (2013.01)

(56) References Cited

U.S. PATENT DOCUMENTS

| 2003/0161376 A1* | 8/2003 | Zapata | 372/70 |
| 2005/0047456 A1* | 3/2005 | Rice | 372/35 |
| 2009/0073550 A1 | 3/2009 | Falcoz et al. | |

FOREIGN PATENT DOCUMENTS

| JP | 06-268290 A | 9/1994 |
| JP | 6-120586 A | 11/1995 |
| JP | 11-330597 A | 1/2001 |
| JP | 2007-110039 A | 4/2007 |
| JP | 2007-188980 A | 7/2007 |
| WO | 03/061082 A1 | 7/2003 |

OTHER PUBLICATIONS

Aldo Antognini, et al. "Thin-Disk Yb:YAG Oscillator-Amplifier Laser, ASE, and Effective YB:YAG Lifetime", IEEE Journal of Quantum Electronics, Aug. 1, 2009, pp. 993-1005, vol. 45, No. 8, IEEE Service Center, Piscataway, NJ, USA, XP011264011.

J.D. Bonlie, et al., "Production of > 1021 W/cm2 from a Large-Aperture Ti:Sapphire Laser System", Applied Physics B Laser and Optics, Jun. 2000, pp. S155-S160, vol. B70, Springer-Verlag, DE, XP002629587.

Steve Guch, Jr., "Parasitic Suppression in Large Aperture Disk Lasers Employing Liquid Edge Claddings", Applied Optics, Jun. 1, 1976, pp. 1453-1457, vol. 15, No. 6, Optical Society of America, Washington, DC, USA, XP002419100.

CN Office Action issued Jul. 21, 2014 in CN Patent Application No. 201180044804.6.

Japanese Office Action issued May 26, 2015 for JP Application 2013-520132.

* cited by examiner

DEVICE FOR AMPLIFYING A LASER BEAM WITH SUPPRESSION OF TRANSVERSE LASING

CROSS-REFERENCE TO RELATED APPLICATIONS

This application is a National Stage of International patent application PCT/EP2011/062385, filed on Jul. 19, 2011, which claims priority to foreign French patent application No. FR 1003042, filed on Jul. 20, 2010, the disclosures of which are incorporated by reference in their entirety.

FIELD OF THE INVENTION

The field of the invention is that of the amplification of a laser beam and more particularly that of amplifying bars.

BACKGROUND

The manner of operation of a laser beam amplification device is briefly recalled. It mainly comprises an amplifying medium and pumping sources which inject energy into the amplifying medium. This amplifying medium which has the shape of a bar may be a crystal, or else a doped glass. Thereafter, the laser beam to be amplified traverses the amplifying bar one or more times by means of optical devices with mirrors for example; on each pass it extracts a part of the energy injected during the pumping and is thus amplified in the amplifying bar. For an amplifying bar of cylindrical shape, the energy deposited during pumping is generally confined in the central part, delimited by the diameter D of the pump beam, of the amplifying bar. Part of the energy deposited during pumping is not converted into luminous energy but into thermal energy in the amplifying medium; this thermal energy must be removed by means of a cooling device (based on water for example), which will have to be all the more effective the higher the thermal power (product of the thermal energy and the pulse repetition rate of the laser).

On this type of configuration of laser beam amplification device, a parasitic phenomenon called transverse lasing arises between the deposition of energy in the amplifying bar by optical pumping and its extraction by the beam to be amplified.

This phenomenon is related to the creation in the amplifying bar of a laser sub-cavity along an axis transverse to the longitudinal axis of the amplifying bar, the breaks in refractive index at the amplifying bar-environment interface ensuring the function of mirrors of this sub-cavity. Transverse lasing occurs when the oscillation condition for this sub-cavity is satisfied, that is to say when there is conservation of the energy over an outward-return trip within the sub-cavity, or stated otherwise when the transverse gain G compensates for the losses P of the sub-cavity.

Hereinafter, a crystal is taken as exemplary amplifying bar; it can of course be replaced with doped glass.

Represented in FIG. 1 is the transverse optical gain G in a cylindrical amplifying crystal 1 pumped along the longitudinal axis Ox of the crystal, by its two faces S1, S2 by a pumping laser beam 3 of diameter D. The pumping laser is typically a solid laser or a fiber laser or a laser diode. If $g_0$ designates the lineal density of gain, the small-signal gain $g_{ps}$ is equal to $g_0.e$ in the longitudinal direction Ox and to $g_0.D$ in a transverse direction perpendicular to Ox. We commonly have D≥e (the quantities are not to scale in the figure so as to facilitate the reading of the gain curve); the length e of the crystal is typically between 2 and 5 cm, and the diameter D between 5 and 20 cm.

The optical gain G being proportional to $e^{g_{ps}}$, we have:

$$e^{g_0.D} >> e^{g_0.e}$$

The optical gain G in the transverse direction is therefore much larger than the optical gain G in the longitudinal direction, that is to say in the direction of the laser beam to be amplified.

Transverse lasing is manifested as a strong evacuation of the energy stored in the crystal, caused by unchecked transverse stimulated emissions, at the expense of the laser beam that it is desired to amplify.

This transverse lasing is particularly troublesome in the case of solid amplifying media with high gains and of large dimensions (typically a gain $g_0$ of 0.88 and a pump diameter of 70 mm). It prevents for example the generation of femtosecond laser pulses of very significant peak power, typically of the order of a petawatt, on the basis of a Tl:Sapphire crystal pumped at high energies of the order of 100 J.

Hitherto, parasitic lasing was suppressed by increasing the losses P for the parasitic beam by placing on the periphery of the crystal a material which is absorbent at the fluorescence wavelength of the crystal; in order for the device to be fully effective it is moreover necessary that the refractive index of the crystal and that of the absorbent material be as close as possible so as to avoid appreciable reflection at the crystal interface—which absorbent material would lead to the occurrence of parasitic lasing. This may for example be achieved by means of an absorbent liquid in which the surface Σ connecting the faces S1 and S2 of the crystal is immersed. This solution is described in patent application FR 2 901 067. The liquid used comprises a solvent whose refractive index is close to that of the crystal, and a dye which is absorbent at the fluorescence wavelength of the crystal. The material used may also be a solid as described in the publication "Production of >$10^{21}$ W/cm$^2$ from a large-aperture Ti:sapphire laser system" by J D Bonlie et al (Applied Physics B (Lasers and Optics)) Springer-Verlag Germany, vol B70 June 2000.

In the case of a Tl:Sapphire amplifying crystal, the refractive index n is equal to 1.76. To increase the losses at the interface with a liquid, the index of the liquid used must be close to that of the crystal; the two indices are considered to be close if their difference of index is less than or equal to 0.01. This liquid substitutes for the water customarily surrounding the crystal, whose function is to remove the thermal power generated in the crystal by the pumping process. It must therefore also ensure this function of removing the thermal power in addition to the function of suppressing the transverse lasing; now, the thermal properties and first and foremost the heat capacity of liquids of this type are well shy of those of water, thereby rendering them inoperative when the laser repetition rate and as a consequence the mean thermal power are high, typically above 1 Hz for an amplifier of high energy, that is to say greater than 30 Joules. This liquid is moreover very corrosive. It is furthermore expensive and toxic and therefore dangerous to use; it deteriorates over time.

Consequently, there still remains a need for a device that simultaneously satisfies all the aforementioned requirements, in terms mainly of suppression of transverse lasing and removal of the mean thermal power for appreciable values of these (typically greater than 100 Watts) but also of safety of use and of robustness over time.

SUMMARY OF THE INVENTION

The solution afforded by the invention uses a structure which appreciably increases the losses so as to prevent parasitic lasing by a means other than equalizing the refractive indices, thereby allowing operation with very efficacious means for removing the thermal power, for example water cooling. Accordingly, use is made of a crystal or an assemblage of crystals having a particular geometric structure which makes it possible to increase the number of interfaces and therefore the number of reflections at the interfaces, notably in the neighborhood of the faces S1 and S2 where the gain is particularly significant, and an absorbent liquid having a suitable heat capacity. The number of extra reflections must be high enough ($\geq 2$) and/or the reflection coefficients low enough ($\leq 0.1$) for the losses to be greater than the gain.

More precisely the subject of the invention is a device for amplifying a laser beam along an axis Ox, which comprises:

an amplifying bar structure of index $n_c$, of fluorescence wavelength $\lambda$, delimited by a surface $\Sigma$ connecting the input face S1 and output face S2 of the amplifying bar, and having a dimension e along the direction Ox and a dimension $\Phi$ along a direction of the plane Oyz perpendicular to Ox, with $e<\Phi$, and intended to be pumped along the axis Ox so as to become an optical gain medium of diameter D centered on the axis Ox, the optical gain exhibiting a maximum along a face S1 or S2 of the structure of the amplifying bar, termed the maximum gain face, and a liquid of index $n_A$ which surrounds the structure of the amplifying bar in relation to its surface $\Sigma$.

It is mainly characterized in that the surface $\Sigma$ comprises a first tooth in the form of a chamfer over all or part of its junction with the maximum gain face, oriented at an angle $\alpha 1$ with respect to Ox, and having a length e1' labeled along the axis Ox, e1' being greater than a predetermined threshold length, so as to avoid causing parasitic transverse lasing, in that the liquid of index $n_A$ has a heat capacity of greater than 3000 Joules per kilogram per degree Kelvin, so as to dissipate the thermal power induced by the pumping when the latter exceeds 100 Watts and in that a density which is absorbent at the fluorescence wavelength $\lambda$ of the amplifying bar structure, and/or an element which is absorbent at this wavelength, is immersed in the liquid.

Preferably, the surface $\Sigma$ comprises a second tooth with two faces, the face oriented toward the first tooth being inclined at an angle $\beta 1$ with respect to the axis Ox, $\alpha 1$ and $\beta 1$ being such that the photons propagating parallel to the maximum gain face and reflected with significant losses (that is to say with a reflection coefficient $\leq 0.1$) by the first tooth arrive perpendicularly at this face of the second tooth.

According to a characteristic of the invention, the gain medium exhibits another maximum along the other face of the structure of the amplifying bar; the surface $\Sigma$ then exhibits a third tooth in the form of another chamfer over all or part of its junction with this other maximum gain face and over a length e2' labeled along the axis Ox, e2' being greater than the predetermined threshold length, this other chamfer being oriented at an angle $\alpha 2$ with respect to Ox, the second face of the second tooth (oriented toward this third tooth) being inclined at an angle $\beta 2$ with respect to the axis Ox, $\alpha 2$ and $\beta 2$ being such that the photons propagating parallel to this other maximum gain face and reflected by the third tooth arrive perpendicularly at this face.

The liquid of index $n_A$ is for example a liquid in which a density which is absorbent at the fluorescence wavelength $\lambda$ of the structure of the amplifying bar is immersed.

The threshold length is advantageously predetermined as a function of the optical gain.

According to another characteristic of the invention, the angle $\alpha 1$ and/or the angle $\alpha 2$ make it possible to avoid total internal reflection; they are such that $$\sin \alpha 1 < n_A/n_c \text{ and } \sin \alpha 2 < n_A/n_c.$$

We typically have:
e1'=e2', $\alpha 1=\alpha 2$, $\beta 1=\beta 2$.

According to a first embodiment of the invention, the input and output faces are circular and the tooth (or teeth) exhibits (exhibit) a symmetry of revolution in relation to the axis Ox.

According to a variant embodiment, the tooth (or teeth) is (are) produced on two opposite parts of the surface $\Sigma$.

According to a second embodiment of the invention, the input and output faces are rectangular and the tooth (or teeth) is (are) produced on two parts of the surface $\Sigma$ that are situated along two opposite sides of the rectangle.

The amplifying bar structure may be crystal or doped glass.

The structure of the amplifying bar may comprise only a crystal or only a doped glass. It can also comprise a (or several) crystal (crystals) or doped glass (glasses) each furnished with a (or several) tooth (teeth).

The subject of the invention is also a method of using a device for amplifying a laser beam such as described, characterized in that it comprises a step of pumping the device, and in that this pumping induces a thermal power of greater than 100 Watts mean.

BRIEF DESCRIPTION OF THE DRAWINGS

Other characteristics and advantages of the invention will become apparent on reading the detailed description which follows, given by way of nonlimiting example and with reference to the appended drawings in which.

Across the figures, the same elements are labeled by the same references.

DETAILED DESCRIPTION

Hereinafter, an amplifying bar made of crystal is taken as an example. It can be replaced with doped glass such as for example phosphate glass or silicate glass doped with Neodymium ions or Ytterbium ions.

Figure 2:
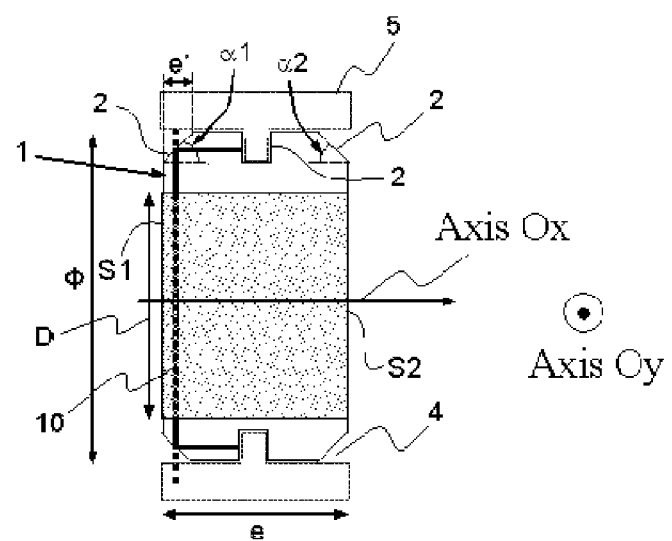

FIG. 2 shows a crystal structure 1 with a single crystal, whose geometry is modified by adding "teeth" 2 to the surface $\Sigma$, which are so many new interfaces on which the photons are in part reflected, the other part being absorbed or scattered.

The angle $\alpha$ of each tooth with respect to the axis Ox is optimized to avoid total internal reflection inside the crystal, since the aim is for part of the photons to be transmitted. We therefore want:

$$\sin(\alpha) < n_A/n_c, \text{with } n_A < n_c$$

$n_c$ being the index of the crystal, $n_A$ the index of the liquid A forming with the crystal this interface.

Accordingly, it is possible to modify the angle $\alpha$ and/or the index $n_A$.

It is furthermore necessary that the photons transmitted do not return: it is therefore necessary that they be absorbed or scattered by this liquid A which is therefore an absorbent or scattering liquid for the fluorescence wavelength(s) of the crystal. The surface $\Sigma$ is then immersed in this absorbent liquid A; in a conventional manner this absorbent liquid is contained in a reservoir which surrounds this surface $\Sigma$ in a leaktight manner.

In the case of a TI:Sapphire crystal, the wavelength(s) are around 800 nm. Two cases are possible:
1. The liquid A is a homogeneous absorbent or scattering liquid, which surrounds the surface $\Sigma$.
2. If the liquid A is solely an index matching liquid, an absorbent density or a scatterer is then immersed in this liquid. In this case the density or scatterer faces towards the surface $\Sigma$ (the density is for example a plate in the form of an annulus situated in the plane (Oy,Oz) which is perpendicular to the axis Ox); it may surround $\Sigma$ but not necessarily.

This liquid A may be an absorbent or scattering index liquid; there exist such liquids whose index $n_A$ may be close to $n_c$ which are usable if the thermal power to be removed is low (case of low laser pulse repetition rates, up to 1 Hz maximum): involving for example a mixture of an index matching liquid with a dye, absorbent at the fluorescence wavelength of the crystal or an index matching liquid in which a density or a scatterer is immersed as indicated previously. Such a liquid is however very corrosive and deteriorates over time. But the more $n_A$ differs from $n_c$, the more the reflection increases.

When the thermal power to be removed induced by the pumping is significant (greater than 100 Watts mean), use is made of a non-absorbent liquid 4 having good properties as regards removal of thermal power, dubbed an index liquid, whose refractive index is closer to that of the crystal than if air were involved (whose index is equal to 1) so as to reduce the reflection but in which an absorbent or scattering element, dubbed a density 5, is immersed. This density is typically a neutral density or an absorbent glass or a stack of densities, of absorbent glasses or both. The index liquid 4 then has a function of matching between the crystal 1 and the density 5. Since water allows effective cooling, colored water or water in which a density is immersed is preferably chosen as absorbent liquid. This liquid is for example water whose index is equal to 1.33 or a water-ethylene glycol mixture whose index is 1.38.

Ultimately, all the photons transmitted at the interfaces are absorbed or scattered by the density 5 or the absorbent or scattering liquid whose absorption spectra cover the fluorescence spectrum of the crystal.

By virtue of the geometry of the crystal which introduces significant losses for the parasitic beam, it is possible to circumvent the use of a liquid allowing quasi-perfect index matching, but which is not compatible with operation at high thermal load. Use is therefore made of a liquid whose heat capacity allows efficacious removal of the heat deposited during pumping, even if it allows only partial index matching (with a discrepancy between the refractive indices of the order of 0.3). The geometry of the crystal makes it possible to decouple the cooling and index matching function on the one hand, from the absorption function on the other hand.

The lineal gain $g_0$ increases as a function of the doping of the crystal and as was seen in the preamble, the optical gain G along the axis Ox increases as a function of the thickness e of the crystal and of its lineal gain.

The number of teeth 2 is therefore calculated as a function of the doping of the crystal 1: as many teeth are added as necessary to avoid a laser effect parallel to the faces S1 and S2 of the crystal and close to them, that is to say precisely where the optical gain G is particularly high.

The transverse sub-cavity liable to cause transverse lasing is situated in the neighborhood of a face S1 if the crystal 1 is pumped only through this face S1. A second transverse sub-cavity liable to cause transverse lasing is situated in the neighborhood of the other face S2 if the crystal is also pumped through this face S2.

The gain being a maximum at the level of a face S, the crystal is cut in such a way that it exhibits a first tooth 2 in the form of a chamfer at the junction of the surface $\Sigma$ and of this face where the gain is a maximum, this chamfer being inclined by an angle $\alpha$ to the axis Ox, the inclination preferably being oriented toward the exterior of the crystal. We typically have $\alpha$ lying between 30 degrees and 50 degrees. The length of the chamfer is such that its projection e' on Ox covers at least a length $L_{Gthresh}$ where the optical gain is liable to contribute to transverse lasing, that is to say when it exceeds a predetermined threshold: $G>G_{thresh}$. As $G_{thresh}$ is proportional to $e^{g_0 \cdot L_{Gthresh}}$, we then have $e' \geq L_{Gthresh}$. We typically have e' lying between e/20 and e/6. If there is a chamfer on one side only, it is preferable to provide a means such that the photons do not return to the gain zone; absorption means are provided. It is for example possible to dispose an absorbent medium (L-shaped), which forms a return to partly cover the other face.

The case is now considered where the gain is a maximum on the two faces and $\alpha 1$ and $e1'$ designate the characteristics of the chamfer of the face S1 (the first tooth). Another tooth 2 (termed the third tooth subsequently) is provided in the form of a second chamfer at the junction of the surface $\Sigma$ and of the other face S2, this chamfer being inclined toward the exterior of the crystal by an angle $\alpha 2$ and having a projection e2' on Ox with $e2' \geq L_{gthresh}$.

These teeth are designated along the axis Ox: a first tooth at the junction with S1, a cleft termed the second tooth described hereinbelow and a third tooth at the junction with S2.

Preferably provision is also made for another second tooth 2, having two inclined faces and also designated a cleft, situated between the first and third teeth described above (the two chamfers). The angle $\alpha 1$ of the first tooth is such that the photons 10 propagating parallel to the maximum gain face S1 and reflected by the first chamfer arrive perpendicularly at the first face of this second tooth (or cleft), itself inclined at an angle at 90° with respect to the angle of incidence of the photons on this face. In this way the photons will, on the basis of this second diopter, make a return journey in the opposite direction to the outward journey so as not to reach the second face where the gain is again a maximum. This first face of this second tooth (or cleft) 2 is more generally inclined by an angle $\beta 1$ with respect to the axis Ox such that:

$$\beta 1 = \pi - 2\alpha 1$$

For the same reasons, the second face of this cleft is inclined by an angle $\beta 2$ such that:

$$\beta 2 = \pi - 2\alpha 2$$

The length along Ox of this cleft is typically greater than or equal to half the total length of the crystal.

According to an alternative this cleft may be divided into two teeth:
- one close to the chamfer of S1 with a face inclined at β1 (the one which is oriented toward S1), with no inclination constraint for the other face,
- the other close to the chamfer of S2 with a face inclined at β2 (the one which is oriented toward S2), with no inclination constraint for the other face.

There are typically three teeth as represented in FIG. 2, a first tooth at the junction with S1, a cleft termed the second tooth and a third tooth at the junction with S2 with:

$$\alpha1=\alpha2=\pi/4, \beta1=\beta2=\pi/2.$$

This cleft or second tooth can also be provided even in the absence of maximum gain on the second face and therefore in the absence of a "third" tooth at the junction of Σ and of S2. In this case, there is no longer any constraint on β2.

If it is considered on the one hand that the first tooth generates a diopter of reflection coefficient R1, and the second tooth (or cleft), a diopter of reflection coefficient R2 which sends the photons back the same way but in the opposite direction, and that on the other hand E is the energy of the photons incident on the first tooth, the photons then have an energy E' after their return journey on the two diopters, E' being proportional to $E \times R2 \times R1^2$.

To decrease the reflection coefficients, the surface Σ can furthermore be frosted.

For a crystal that is substantially cylindrical (that is to say to within the teeth) with circular cross-section, the teeth 2 at the surface Σ may themselves have symmetry of revolution around Ox. This is the case for example for an Nd:Yag crystal for which the optical gain G also has symmetry of revolution.

For other crystals such as TI:Sapphire, the gain is a maximum in relation to a specific diameter D whose orientation is determined on the basis of the crystallographic axes of the crystal.

For a crystal that is substantially cylindrical (that is to say to within the teeth) with rectangular cross-section, the surface Σ then exhibits four sides corresponding respectively to the sides of the rectangle. The teeth 2 are then present preferably on two parallel opposite sides which are the sides where the gain is a maximum.

Figure 5:
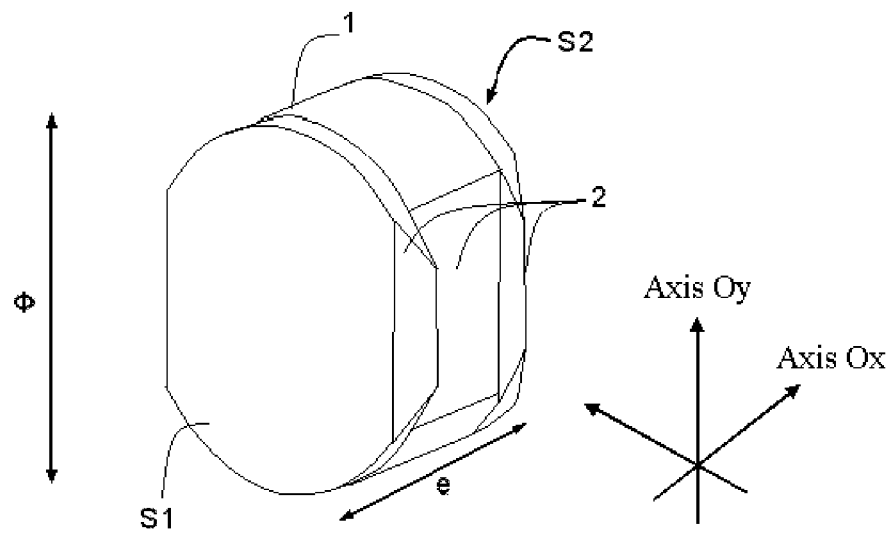

Represented in FIG. 5 is a structure with a single crystal 1 whose face S1 exhibits a first tooth on two opposite parts of S1 and the axis of whose chamfer is along Oy, the face S2 exhibits a third tooth of the same shape as the first tooth but of opposite inclination. This crystal also comprises a cleft (or second tooth) likewise in two parts and whose width along Ox covers the distance between the first and third teeth.

Figure 6:
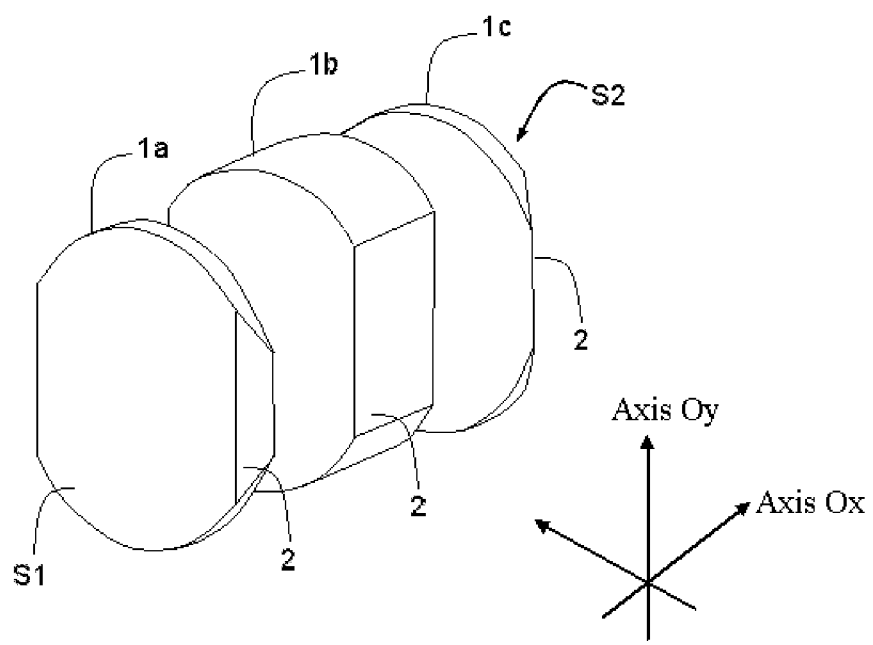

FIG. 6 shows a crystal structure with three crystals, exhibiting the same geometry as the structure of FIG. 5 with a first crystal 1a for the first tooth, a second crystal 1b for the second tooth and a third crystal 1c for the third tooth.

Figure 1:
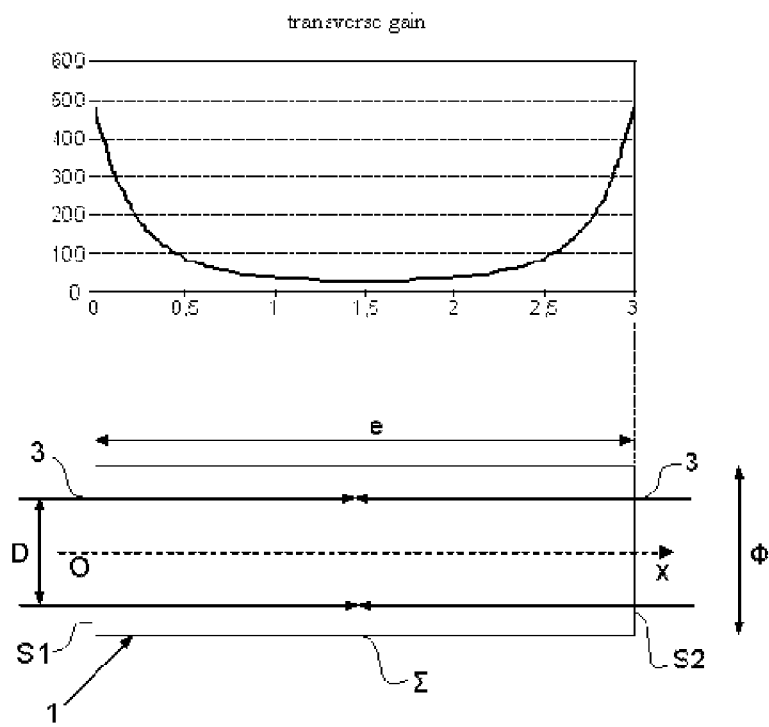
FIG. 1, already described, schematically represents an exemplary amplifying crystal pumped by a pumping beam, and a corresponding exemplary optical gain G, FIG. 2 schematically represents an exemplary amplification device according to the invention, with three teeth, seen in section along the axis Ox, FIG. 3 schematically represents the losses R of an exemplary amplifying crystal structure with three teeth, FIG. 4 schematically represents the product G×R of the same exemplary amplifying crystal structure with three teeth, FIG. 5 schematically represents an exemplary crystal structure with a single crystal, having three teeth, seen in perspective, FIG. 6 schematically represents, exploded, an exemplary crystal structure with an assemblage of three crystals, and three teeth, seen in perspective.

The following results have been obtained for an amplifying crystal structure 1 with a single crystal such as represented in FIG. 2. More precisely, this is a TI:Sapphire crystal 1 with a thickness e of 30 mm, having a circular cross-section of diameter Φ of 80 mm (before producing the teeth) whose faces S1 and S2 exhibit a chamfer at 45°, of projection e' of 5 mm at the junction of Σ with each face (α1=α2=45° and e1'=e2'=e'=5 mm), (i.e. a first and a third tooth), and a second tooth 2 situated between the two chamfers and whose faces are oriented at 90° and of length 15 mm along Ox. The coefficient of absorption of the pumping laser beam is 0.84 cm$^{-1}$ at 532 nm i.e. an absorption of the pump energy on the axis of propagation of the pumping laser beam in one pass of 98%. The transverse optical gain obtained along this axis of propagation of the pumping laser beam Ox has been presented in FIG. 1 and corresponds to a pumping through the two faces with a Fluence of 1.46 J/cm2. The saturation fluence for the laser beam to be amplified in this crystal at 800 nm is estimated at 1.1 J/cm2. The diameter D of the pumping beam is 70 mm.

Figure 3:
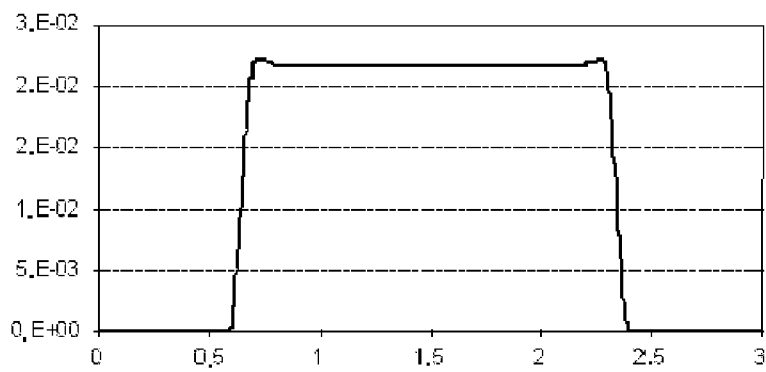

The losses at the interfaces for the laser effect parallel to the faces have been calculated with $R1^2=0.04$ and $R2=0.02$. The proportion of energy reinjected R in the cavity after an outward-return trip of the photons, equal to:

$R=R2\times R1^2$, is represented in FIG. 3.

Figure 4:
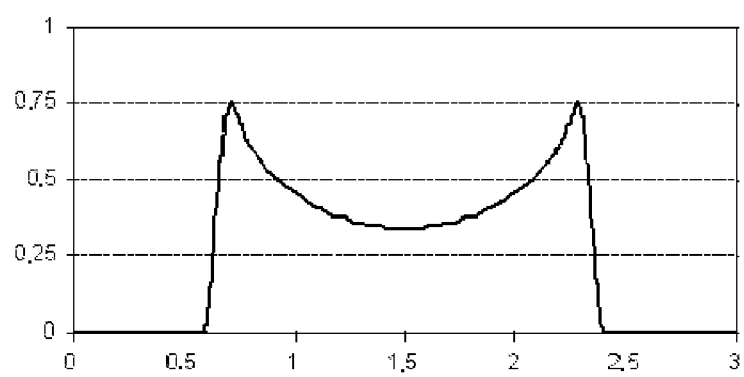

To avoid the transverse laser effect, the product of the gain and the proportion of energy reinjected G×R must be less than 1. FIG. 4 shows that by virtue of these three teeth, the product G×R is less than 0.75.

The invention claimed is:

1. A device for amplifying a laser beam along an axis Ox, comprising:
    an amplifying bar structure of index $n_c$, of fluorescence wavelength λ, delimited by a surface Σ connecting an input face S1 and an output face S2 of the amplifying bar structure, and having a dimension e along the direction Ox of between 2 cm and 5 cm, and a dimension Φ along a direction of a plane Oyz perpendicular to Ox, with e<Φ, and pumped along the axis Ox to become a medium with an optical gain of diameter D centered on the axis Ox, the optical gain exhibiting a maximum along the input face S1 or the output face S2 of the amplifying bar structure, termed as a maximum gain face, and
    a liquid of index $n_A$ which surrounds the amplifying bar structure in relation to the surface Σ, the liquid being water or a water-ethylene glycol mixture,
    wherein the surface Σ comprises a first tooth in the form of a chamfer over all or part of a junction of the surface Σ with the maximum gain face, oriented at an angle α1 with respect to Ox of between 30° and 50°, and having a length e1' labeled along the axis Ox, e1' being greater than a predetermined threshold length and less than e/6, to avoid causing a parasitic transverse lasing, such that the liquid of index $n_A$ has a heat capacity of greater than 3000 Joules per kilogram per degree Kelvin to dissipate a thermal power induced by the pumping, and a discrepancy between nA and nc is of the order of 0.3 and as much as 0.43, a density of the liquid making the liquid absorbent at the fluorescence wavelength λ of the amplifying bar structure, and an element which is absorbent at this wavelength, is immersed in the liquid.

2. The device for amplifying a laser beam as claimed in claim 1, wherein the surface Σ comprises a second tooth with two faces, the face oriented toward the first tooth being inclined at an angle β1 with respect to the axis Ox, α1 and β1 being such that photons propagating parallel to the maximum gain face and reflected by the first tooth arrive perpendicularly at said face of the second tooth.

3. The device for amplifying a laser beam as claimed in claim 2, wherein a gain medium exhibits another maximum along the other face of the amplifying bar structure such that the surface Σ exhibits a third tooth in the form of another chamfer over all or part of another junction with the other maximum gain face and over a length e2' labeled along the axis Ox, e2' being greater than a predetermined threshold length, the another chamfer being oriented at an angle α2 with respect to Ox, the second face of the second tooth being inclined at an angle β2 with respect to the axis Ox, α2 and β2 being such that the photons propagating parallel to said other maximum gain face and reflected by the third tooth arrive perpendicularly at said other maximum gain face.

4. The device for amplifying a laser beam as claimed in claim 1, wherein the threshold length is determined as a function of the optical gain.

5. The device for amplifying a laser beam as claimed in claim 1, wherein the angle α1 is such that $\sin \alpha1 < n_A/n_c$.

6. The device for amplifying a laser beam as claimed in claim 1, taken in combination with claim 3, wherein the angle α2 is such that:

$$\sin \alpha2 < n_A/n_c.$$

7. The device for amplifying a laser beam according to claim 3, wherein e1'=e2', α1=α2, β1=β2.

8. The device for amplifying a laser beam as claimed in claim 1, wherein the input and output faces are circular and in that the tooth (or teeth) exhibits (exhibit) a symmetry of revolution in relation to the axis Ox.

9. The device for amplifying a laser beam as claimed in claim 1, wherein the tooth (or teeth) is (are) produced on two diametrically opposite parts of the surface Σ.

10. The device for amplifying a laser beam as claimed in claim 1, wherein the input and output faces are rectangular and in that the tooth (or teeth) is (are) produced on two parts of the surface Σ that are situated along two opposite sides of the rectangle.

11. The device for amplifying a laser beam as claimed in claim 1, wherein the amplifying bar structure comprises a single crystal or a single doped glass.

12. The device for amplifying a laser beam as claimed in claim 1, wherein the crystal structure comprises a crystal or a doped glass per tooth.

13. The device for amplifying a laser beam as claimed in claim 1, wherein the crystal is Ti:Sapphire.

14. A method of using a device for amplifying a laser beam as claimed in claim 1, further comprising a step of pumping the device, and in that this pumping induces a thermal power of greater than 100 Watts mean.

* * * * *